Nov. 25, 1947.  A. L. CHRISTIANSEN  2,431,465
FISH MACHINE
Filed Nov. 17, 1941  2 Sheets-Sheet 1

INVENTOR.
ANDREW L. CHRISTIANSEN
BY
William E. Hall
ATTORNEY

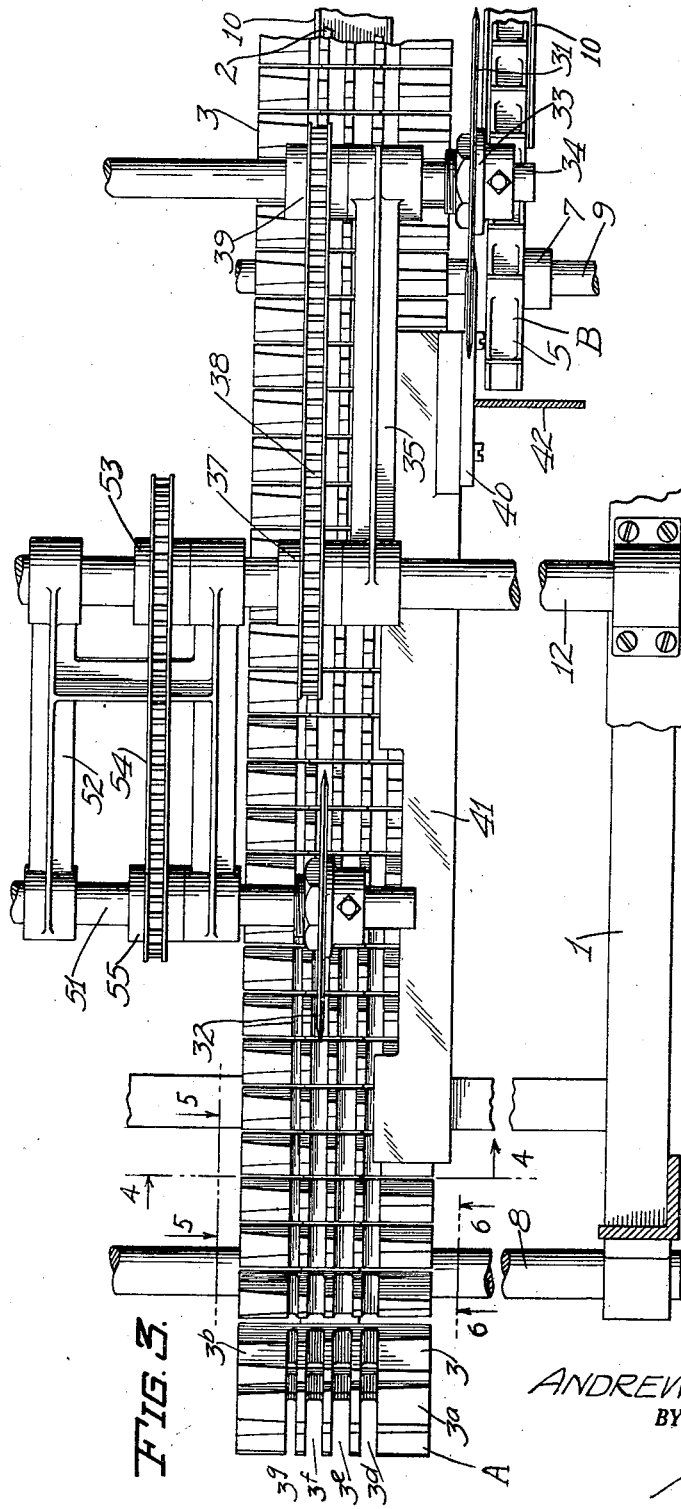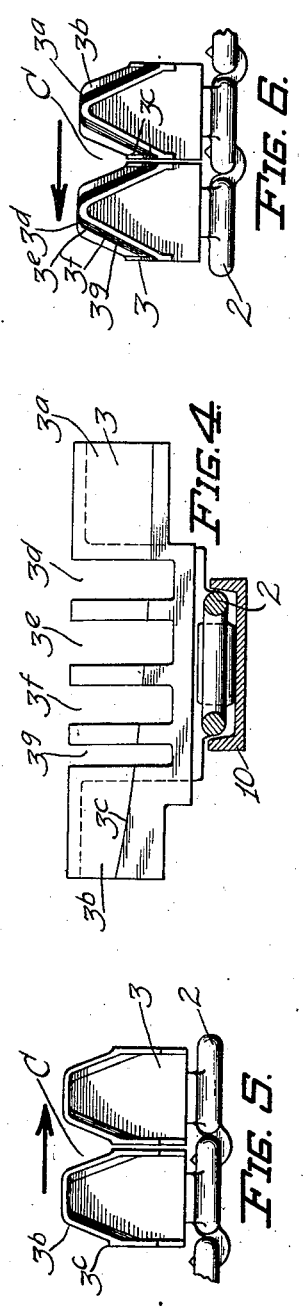

Patented Nov. 25, 1947

2,431,465

UNITED STATES PATENT OFFICE 2,431,465

FISH MACHINE

Andrew L. Christiansen, Willowbrook, Calif.

Application November 17, 1941, Serial No. 419,396

5 Claims. (Cl. 17—4)

My present invention relates to fish machines, and particularly to means for conveying fish therethrough for the purpose of removing undesirable parts thereof and for cutting the same to predetermined lengths.

This application is a continuation-in-part of application Serial No. 162,581, for a Fish machine, which application resulted in U. S. Patent No. 2,304,337, December 8, 1942.

One of the principal objects of this invention is to provide a conveying means for a machine of this class whereby fish to be conveyed thereby and cleaned therein are securely held in a relatively fixed position, against lateral tilting, throughout various portions of their length.

Another important object of this invention is to provide a conveying means for a machine of this class which is provided with fish locating pockets in which fish are urged automatically toward the end of the pockets adapted to receive the head ends of the fish.

An important object also of this invention is to provide a conveyor of this class which is adapted to convey and properly position or locate fish of varying sizes.

A further important object of this invention is to provide a conveyor of this class which is particularly simple and economical of construction, durable and which will not readily deteriorate or get out of order.

Still another object of this invention is to provide a machine of this class having a fish conveyor provided with transverse pockets divided longitudinally into sections forming channels between the sections, which channels extend longitudinally with respect to the conveyor, and a machine having a cutter adapted to extend into one of said longitudinal channels, and so mounted as to be readily raised above and shifted laterally over the conveyor, and lowered into another of said channels.

With these and other objects in view, as will appear hereinafter, I have devised improvements in fish machines having certain novel features of construction, combination, and arrangement of parts and portions, as will be hereinafter described in detail, and particularly set forth in the appended claims, reference being had to the accompanying drawings, and to the characters of reference thereon, which form a part of this application, in which:

Fig. 3 is a fragmentary plan view thereof; and,

Figure 1:
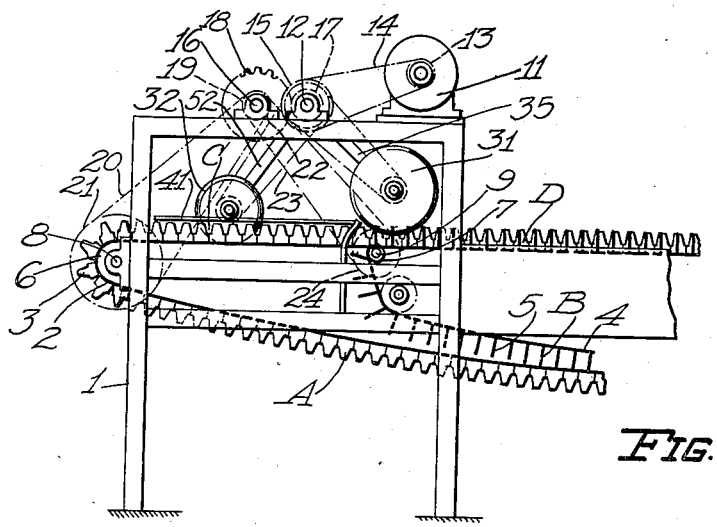
Fig. 1 is a fragmentary side elevation of one end, designated the rear end, of a fish machine incorporating my invention.
Figure 2:
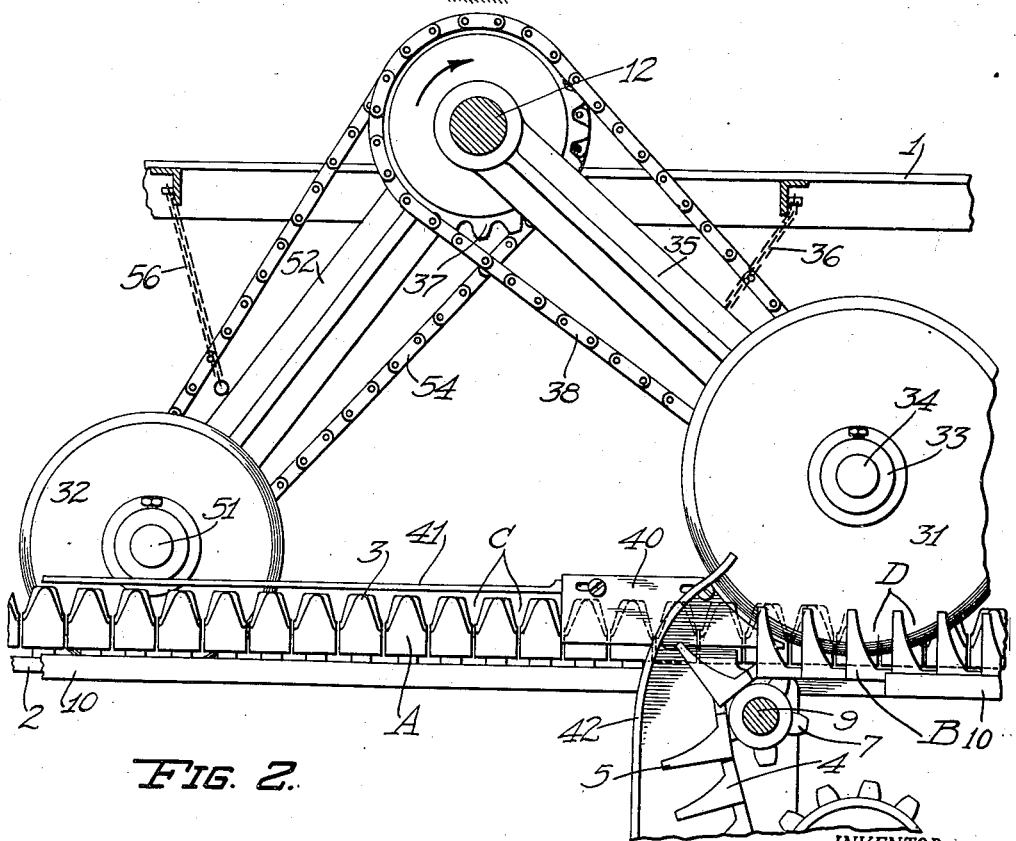
Fig. 2 is a fragmentary enlarged side elevation of the same end of the machine.

Figs. 4, 5, and 6, are enlarged fragmentary sectional views, taken respectively through section lines 4—4, 5—5, and 6—6, of Fig. 3, showing in detail the construction of the fish carrying and positioning blocks of the fish conveyor.

The machine shown is mounted on a frame 1, and has two belt conveyors A and B, the former for carrying the main portions of the fish through the machine, and the latter synchronized with the former, for supporting the heads.

The conveyor A consists essentially of a link belt 2 on which are carried transversely positioned pocket members or blocks 3. A fish-carrying pocket C is formed between adjacent blocks. The conveyor B also consists of a link belt 4 on which are mounted outwardly extending brackets 5, which provide pockets D between adjacent brackets. The pockets at the upper stretches of the conveyors A and B are aligned and synchronized, the body portions of the fish being arranged to lie in the pockets C while the heads lie in the pockets D. The discharge end of the conveyor B is short of the discharge end of the conveyor A, as will be described hereafter.

The link belt 2 of the conveyor A is mounted, at its opposite ends, on sprockets, only the one at the discharge end being shown, and is designated 6. The belt 4 of the conveyor B is also mounted, at its opposite ends, on sprockets, only the sprocket 7 at the discharge end being shown. These sprockets are mounted respectively on shafts 8 and 9, which are journalled on the frame 1.

The upper stretches of both conveyor belts are located and guided by channel members 10, rigidly supported by the frame.

On the frame is carried a motor 11 which drives a shaft 12 through a sprocket 13, on the motor shaft, a chain 14 and a sprocket 15, on the shaft 12. The shaft 12 drives a shaft 16 through gears 17 and 18, on the respective shafts. The shaft 16 drives the shaft 8 through a sprocket 19, on the shaft 16, a chain 20, and a sprocket 21, on the shaft 8. The shaft 16 also drives the shaft 9 through a sprocket 22, on the shaft 16, a chain 23, and a sprocket 24, on the shaft 9.

The pocket members or blocks 3 may be long cast metal blocks which may be secured to opposed brackets extending outwardly from the opposite sides of the belt 2. These pocket members are located alongside of each other and close together. They are throughout their length of uniform height and of uniform width at their bases. The opposite sides, that is, their leading and following sides, are sloping, and their cross-section increases from the head ends 3ª to the opposite tail ends 3ᵇ. Such construction of the pocket members or blocks also causes the cross-sections of the pockets or channels to decrease from the front or head ends 3ª to the tail ends 3ᵇ, such decrease in the pockets or channels being in width and height. The depth of the pockets decreases from the head to the tail ends of the pocket members, the bottom of the pockets being gradually curved upwardly, as shown by 3ᶜ in Fig. 4. The bottoms of the pockets are located as close to the links of the belt as practicable, so as to restrict separation of the blocks as much as possible when the blocks pass over the sprocket at the discharge end of the conveyor, to prevent fish from falling or being wedged between adjacent blocks. The blocks are also as narrow as practicable in order further to restrict such separation. When so constructed, the opposed sloping sides near the head end of each block converge substantially into a sharp ridge at the top of the block.

The pocket members or blocks are provided intermediate their ends with a plurality of transverse slots 3ᵈ, 3ᵉ, 3ᶠ, and 3ᵍ, dividing the consecutive blocks and pockets into sections. The blocks have corresponding slots which are aligned with each other, providing channels extending longitudinally with respect to the longitudinal extent of the conveyor, for the purposes hereinafter to be described. The corresponding sections of the blocks form series of blocks or pocket sections as will be hereinafter referred to.

The machine shown is provided with a pair of circular cutters 31 and 32, the former being provided to sever the heads of the fish, carried in the pockets, and the latter being adapted to cut the fish to the desired length.

The circular cutter 31 is carried on a hub 33 which is axially adjustable on a shaft 34 journalled at the free end of a frame 35 which is pivotally mounted at its other end on the shaft 12. The free end of the frame drops by gravity and is limited in its lower position by a chain 36. On the shaft 12 is a sprocket 37 which drives, through a chain 38, a sprocket 39 on the cutter shaft 34.

The cutter 31 is spaced back from the discharge end of the conveyor B so that the heads of the fish are partly severed before they are attempted to be wholly separated from the bodies by the paddles or brackets 5 of the conveyor belt 4. Behind and in line with the cutter is a fish retainer plate 40 placed on edge and mounted on the outer edge of a bridge plate 41 located immediately over the top of the conveyor A. The plate 40 retains the bodies of the fish in the pockets of the conveyor A when the heads are struck and separated from the bodies by the paddles of the conveyor B. The plate 41 holds the fish in the pockets of the conveyor A, at least until the tail ends of the fish are severed, as will be later described, and also for other purposes to be described.

In front of the downwardly directed portion of the conveyor B is a guard 42 which prevents the head from being thrown by the paddles when severed from the bodies of the fish.

The cutter 32, for cutting the fish to the desired length, is axially adjustable on a shaft 51 which is carried at the free end of a frame 52 pivoted at its other end on the main shaft 12. The shaft 51 is driven from the shaft 12, through a sprocket 53, on the shaft 12, a chain 54, and a sprocket 55, on the shaft 51. The frame 52 extends in the opposite angular direction from the shaft 12 and is also limited in its downward position by a chain 56, or other suitable means.

Sardines, and other fish, are cut to various lengths to fit various sizes and shapes of cans. I have so constructed my machine that the fish cleaned thereby may be cut thereby to various lengths by only slight manipulation and adjustment. This adjustment is effected by the axial shifting of the cutter 32.

It will be noted that the channels 3ᵈ, 3ᵉ, and 3ᶠ, are wider than channel 3ᵍ. The cutter 32 may be shifted axially to one side or the other of the channel to take care of slight variations in the fish lengths. A slightly shorter length of fish is desired when the fish are to be canned in tomato sauce than when they are to be packed in oil or brine. If a greater variation in length is desired the cutter is raised from its channel by shifting the frame 52 about its pivot shaft 12 until the cutter 32 is raised above the pocket members; the cutter is then shifted axially, opposite or over one of the other or desired channels; that is, it may be shifted axially to the opposite side or series of the same or other pocket or block sections, and again lowered.

It will be here noted that the slots 3ᵈ, 3ᵉ, 3ᶠ, and 3ᵍ, and therefore the channels formed thereby, are deeper than, or extend below the pockets C, so that the fish are wholly cut without interference of the cutter 32 with the pocket members.

Though I have shown and described a particular construction, combination, and arrangement of parts and portions, I do not wish to be limited to the same, but desire to include in the scope of my invention, the construction, combination, and arrangement, substantially as set forth in the appended claims.

I claim:

1. A fish conveyor, comprising a belt having a plurality of long transverse blocks providing long transverse shaped channels adapted to receive fish with their belly portions downwardly, the depth of each channel decreasing from the head to the tail ends of the blocks, the bottom of the channel extending upwardly in gradually curved form from said head end to said tail end to conform substantially to the longitudinal curvature of the belly portions of the fish, said blocks having a plurality of closely positioned transverse slots intermediate their ends, each of the blocks having corresponding slots, the corresponding slots forming channels extending longitudinally with respect to the belt, a cutter adapted to extend into the slots for cutting into the back portions of the fish, and means, mounting said cutter for adjustment laterally within each slot and from slot to slot, to cut the fish in the pockets into various lengths.

2. A fish conveyor, comprising a belt having a plurality of long transverse pocket-forming blocks, adjacent blocks having therebetween a V-shaped channel extending transversely with respect to the belt, the opposite side walls of the channel being formed by adjacent opposed blocks, said channel being adapted to receive fish with their belly portions downward, the bottom of each channel being gradually curved from end to end to conform substantially to the longitudinal curvature of the belly portions of the fish, said blocks having a plurality of closely positioned transverse slots intermediate their ends, each of the blocks having corresponding slots, the corresponding slots forming channels extending longitudinally with respect to the belt, a cutter adapted to extend into the slots for cutting into the back portions of the fish, and means, mounting said cutter for adjustment laterally within each slot and from slot to slot, to cut the fish in the pockets into various lengths.

3. A fish conveyor, comprising a belt having a plurality of long transverse blocks providing long transverse V-shaped channels adapted to receive fish with their belly portions downward, each block having longitudinally spaced end portions and a plurality of narrow ribs between the end portions, said ribs extending transversely of the longitudinal extent of the blocks forming a plurality of relatively wide transverse slots in the blocks, edges of the ribs forming, with the corresponding sides of the end portions, the side walls of the channels, the corresponding slots in each of the blocks forming channels with each other extending longitudinally with respect to the belt, a cutter adapted to extend into the slots for cutting into the back portions of the fish carried in the pockets, and means, mounting said cutter for adjustment laterally with respect to the belt and within each slot and from slot to slot, to cut the fish in the pockets into various lengths.

4. A fish conveyor, comprising a belt having a plurality of long transverse pocket-forming blocks, adjacent blocks having therebetween a V-shaped channel extending transversely with respect to the belt, the opposite side walls of the channel being formed by adjacent opposed blocks, said channel being adapted to receive fish with their belly portions downward, each block having longitudinally spaced end portions and a plurality of narrow ribs between the end portions, said ribs extending transversely of the longitudinal extent of the blocks forming a plurality of relatively wide transverse slots in the blocks, the ends of the ribs forming, with the corresponding sides of the end portions, the side walls of the channels, the corresponding slots in each of the blocks forming channels with each other extending longitudinally with respect to the belt, a cutter adapted to extend into the slots for cutting into the back portions of the fish carried in the pockets, and means, mounting said cutter for adjustment laterally with respect to the belt and within each slot and from slot to slot, to cut the fish in the pockets into various lengths.

5. A fish conveyor, comprising a belt having a plurality of long transverse blocks providing long transverse shaped channels adapted to receive fish with their belly portions downwardly, said blocks having a plurality of closely positioned transverse slots intermediate their ends, each of the blocks having corresponding slots, the corresponding slots forming channels extending longitudinally with respect to the belt, a cutter adapted to extend into the slots for cutting into the back portions of the fish, and means, mounting said cutter for adjustment laterally within each slot and from slot to slot, to cut the fish in the pockets into various lengths.

ANDREW L. CHRISTIANSEN.

REFERENCES CITED

The following references are of record in the file of this patent:

UNITED STATES PATENTS

| Number | Name | Date |
|---|---|---|
| 1,552,463 | Barry | Sept. 8, 1925 |
| 2,304,337 | Christiansen | Dec. 8, 1942 |
| 1,632,200 | Stafford | June 14, 1927 |
| 645,862 | Letson | Mar. 20, 1900 |
| 1,710,327 | Walters | Apr. 23, 1929 |
| 2,086,070 | Dunn | July 6, 1937 |
| 2,166,939 | Christiansen | July 25, 1939 |
| 939,981 | Coburn | Nov. 16, 1909 |
| 1,693,570 | Vale | Nov. 27, 1928 |

FOREIGN PATENTS

| Number | Country | Date |
|---|---|---|
| 763,392 | France | Feb. 12, 1934 |
| 464,100 | Germany | Aug. 9, 1928 |